J. GEHR.
Fifth Wheel.

No. 69,335. Patented Oct. 1, 1867.

Witnesses:
Charles A. Pettit
[signature]

Inventor:
John Gehr
By [signature]
Attorneys.

United States Patent Office.

JOHN GEHR, OF MERCERSBURG, PENNSYLVANIA.

Letters Patent No. 69,335, dated October 1, 1867.

---

IMPROVEMENT IN THREE-WHEEL CARRIAGES.

---

*The Schedule referred to in these Letters Patent and making part of the same.*

---

TO ALL WHOM IT MAY CONCERN:

Be it known that I, JOHN GEHR, of Mercersburg, in the county of Franklin, and State of Pennsylvania, have invented a new and improved Three-Wheel Carriage; and I do hereby declare the following to be a full, clear, and exact description of the same, reference being had to the accompanying drawings, forming part of this specification, and in which—

Similar letters of reference indicate corresponding parts in the two figures.

Figure 1:
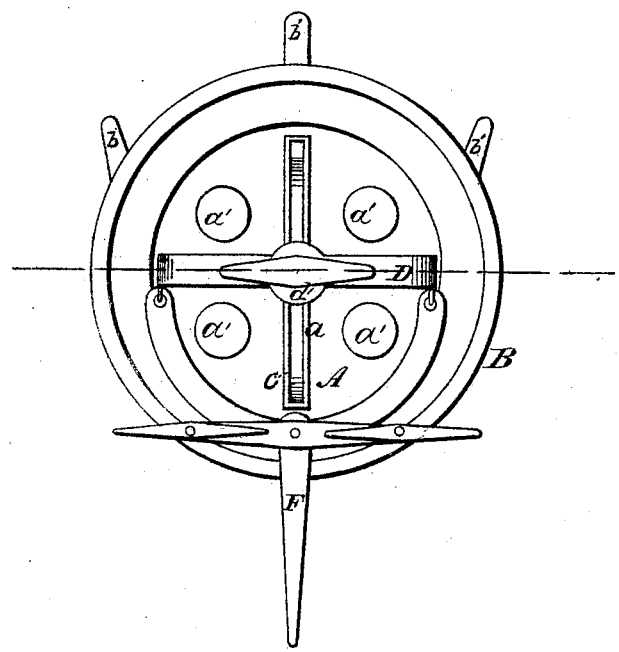
Figure 1 is a top view of my invention.
Figure 2:
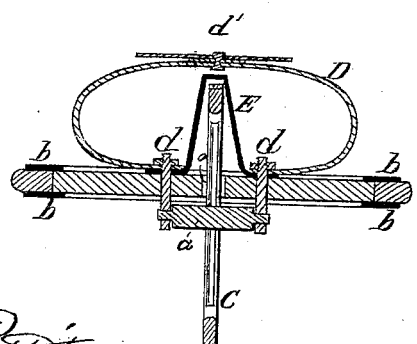
Figure 2 is a vertical section of the same.

In this invention the journals of the forward axle work in boxes attached to a horizontal fixed wheel which supports a revolving ring to which are attached the couplings that connect the forward and rear axles.

In order that others skilled in the art to which my invention appertains may be enabled to make and use the same, I will proceed to describe it in detail.

In the drawings, A A represent a fixed horizontal wheel, of wood, iron, or other suitable material, having the slot $a$ running longitudinally with the carriage to receive the upright wheel, and having the apertures $a'$ $a'$ to diminish the weight of the apparatus. The latter, however, may be omitted, if thought best. Around the periphery of the wheel A is a deep groove, $a''$, formed either by cutting a channel around the wheel, or by bolting upon the upper and under surfaces of the latter the circular flanges $b$ $b$. In this groove runs a ring, B, surrounding the wheel A, and fitting closely to it, yet so as to move freely around it. Suitable provision is made by the projections $b'$ $b'$ upon the ring B for attaching the couplings which connect the apparatus with the rear axle of the carriage. The upright wheel C, upon which the carriage runs, is stationed vertically in the slot $a$, bearing in lugs $c$ $c$ attached to the under side of the horizontal wheel A. D is a spring attached to the upper side of wheel A by the bolts $d$ $d$, and supporting the forward end of the carriage. This spring, it will be observed, is of peculiar construction, being in one piece, with its ends resting on the horizontal wheel, and bearing the "fifth-wheel" of the carriage at $d'$. E is an iron guard bolted to the wheel A by the same bolts which confine the spring D, and passing over the upper part of the wheel C between it and the spring D. F is the shaft of the carriage, attached to the horizontal wheel A. When the flanges $b$ $b$ are used they are fastened to the wheel A in such a manner as to be easily removed if necessary. In this case the ring B may be in one piece; but when a groove is cut in the periphery of wheel A, instead of using the detachable flanges, the ring B must be made in two or more pieces, which can be separately inserted in the groove and then fastened securely together. The former will be the most convenient and perhaps the most economical method of construction.

Having thus described my invention, what I claim as new, and desire to secure by Letters Patent, is—

1. The ring B, working in the groove $a''$ of the wheel A, and having the projections $b'$ $b'$, substantially as and for the purpose specified.

2. The spring D, bent in the form shown, attached to the wheel A by the bolts $d$ $d$, and bearing the carriage at $d'$, substantially as and for the purpose described.

3. The metallic guard E, substantially as and for the purpose specified.

JOHN GEHR.

Witnesses:
 A. H. STUCKLER,
 JOSEPH GRUBB.